United States Patent
Maloum

(10) Patent No.: US 9,802,607 B2
(45) Date of Patent: Oct. 31, 2017

(54) METHOD AND DEVICE FOR SYNCHRONISING AN IDLER PINION OF A GEARBOX WITH THE SHAFT THEREOF

(71) Applicant: RENAULT s.a.s, Boulogne-Billancourt (FR)

(72) Inventor: Abdelmalek Maloum, Chevilly-Larue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/777,621

(22) PCT Filed: Mar. 12, 2014

(86) PCT No.: PCT/FR2014/050559
§ 371 (c)(1),
(2) Date: Sep. 16, 2015

(87) PCT Pub. No.: WO2014/147322
PCT Pub. Date: Sep. 25, 2014

(65) Prior Publication Data
US 2016/0288783 A1     Oct. 6, 2016

(30) Foreign Application Priority Data

Mar. 19, 2013   (FR) ..................... 13 52428

(51) Int. Cl.
*B60W 10/08*    (2006.01)
*B60W 10/02*    (2006.01)
(Continued)

(52) U.S. Cl.
CPC .............. *B60W 20/40* (2013.01); *B60K 6/48* (2013.01); *B60W 10/02* (2013.01); *B60W 10/06* (2013.01);
(Continued)

(58) Field of Classification Search
CPC ...... B60W 20/40; B60W 10/02; B60W 10/06; B60W 10/08; B60W 2510/083;
(Continued)

(56) References Cited

U.S. PATENT DOCUMENTS 6,123,642 A     9/2000  Saito et al.
6,383,114 B1 *  5/2002  Hoshiya ................. B60K 6/365
                                                          477/111
(Continued)

FOREIGN PATENT DOCUMENTS

DE   10 2006 003 715    8/2007
EP        0 928 715     7/1999
(Continued)

OTHER PUBLICATIONS

International Search Report dated Apr. 22, 2014 in PCT/FR14/050559 Filed Mar. 12, 2014.
(Continued)

*Primary Examiner* — Tuan C. To
(74) *Attorney, Agent, or Firm* — Oblon, McClelland, Maier & Neustadt, L.L.P.

(57) ABSTRACT

The invention relates to a method for synchronising the common speed (ω p) of two concentric primary shafts (1, 6) of a hybrid transmission in a hybrid operating mode wherein said two shafts are rotatably connected by a first coupling means (5), with the speed (ω s) of a secondary transmission shaft (10) comprising at least one idler pinion for allowing the coupling of one of said pinions (11, 12) to the shaft (10) thereof by closing a second coupling means (13) that does not have mechanical synchronisation bodies, the torque (Te) of the electric machine being temporarily reduced during the synchronisation phase in order to meet the conditions of a perfect coupling when the value thereof caps at an upper limit value ($T_e^{max}$) or a lower limit value ($T_e^{min}$).

13 Claims, 6 Drawing Sheets

(51) Int. Cl.
  *B60W 10/06* (2006.01)
  *B60K 6/48* (2007.10)
  *B60W 20/40* (2016.01)
  *F16H 61/04* (2006.01)
  *F16H 63/50* (2006.01)

(52) U.S. Cl.
  CPC ......... *B60W 10/08* (2013.01); *F16H 61/0403* (2013.01); *F16H 63/502* (2013.01); *B60W 2510/083* (2013.01); *B60W 2710/02* (2013.01); *B60W 2710/0666* (2013.01); *B60W 2710/083* (2013.01); *B60Y 2200/92* (2013.01); *F16H 2061/0422* (2013.01)

(58) Field of Classification Search
  CPC ..... B60W 2710/02; B60W 2710/0666; B60W 2710/083; B60K 6/48
  See application file for complete search history.

(56) References Cited

U.S. PATENT DOCUMENTS

| | | | |
|---|---|---|---|
| 8,087,483 B2 * | 1/2012 | Bucknor | B60K 6/36 180/65.245 |
| 9,002,604 B2 * | 4/2015 | Toyota | B60K 6/36 477/115 |
| 2005/0241437 A1 * | 11/2005 | Gray | B60K 6/12 74/730.1 |
| 2007/0205036 A1 | 9/2007 | Ogata et al. | |
| 2008/0314176 A1 | 12/2008 | Krieger et al. | |
| 2009/0037060 A1 * | 2/2009 | Carlhammar | B60K 6/387 701/54 |
| 2009/0149294 A1 * | 6/2009 | Wallner | B60K 6/445 477/4 |
| 2011/0021310 A1 * | 1/2011 | Kresse | B60W 10/115 477/3 |
| 2011/0034297 A1 * | 2/2011 | Jerwick | B60K 6/48 477/5 |
| 2012/0080003 A1 * | 4/2012 | Schultz | F02N 11/003 123/179.31 |
| 2013/0325234 A1 * | 12/2013 | Shibata | B60W 20/106 701/22 |
| 2013/0345019 A1 * | 12/2013 | Kaltenbach | B60K 6/387 477/5 |
| 2014/0000412 A1 * | 1/2014 | Kaltenbach | B60K 6/387 74/661 |
| 2014/0136040 A1 * | 5/2014 | Scholz | B60W 10/06 701/22 |
| 2014/0162837 A1 * | 6/2014 | Eisele | B60W 20/00 477/3 |
| 2014/0236441 A1 * | 8/2014 | Sato | B60K 23/00 701/64 |
| 2014/0324256 A1 * | 10/2014 | Aschaber | B63H 21/20 701/21 |
| 2014/0336890 A1 * | 11/2014 | Kresse | F16H 61/68 701/60 |
| 2014/0379191 A1 * | 12/2014 | Hayashi | B60K 6/485 701/22 |
| 2015/0027407 A1 * | 1/2015 | Darnell | B60W 10/06 123/399 |
| 2015/0239335 A1 * | 8/2015 | Wachter | B60K 6/547 475/5 |

FOREIGN PATENT DOCUMENTS

| | | | | |
|---|---|---|---|---|
| EP | 1231096 A2 * | 8/2002 | ............ | B60W 10/06 |
| EP | 2053278 A2 * | 4/2009 | ............ | B60K 6/365 |
| EP | 2055581 A2 * | 5/2009 | ............... | B60K 6/26 |
| FR | 2 785 238 | 5/2000 | | |
| FR | 2 933 247 | 1/2010 | | |
| WO | WO 2009007218 A1 * | 1/2009 | ......... | F16H 61/0213 |
| WO | 2012 131259 | 10/2012 | | |

OTHER PUBLICATIONS

French Search Report dated Jan. 27, 2014 in Application No. FR 1352428 Filed Mar. 19, 2013.

\* cited by examiner

METHOD AND DEVICE FOR SYNCHRONISING AN IDLER PINION OF A GEARBOX WITH THE SHAFT THEREOF

BACKGROUND OF THE INVENTION

Field of the Invention

The present invention relates to the field of the control of gear shifts in a gearbox.

More specifically, it relates to a method of and device for synchronizing the speed common to two concentric primary shafts of a hybrid transmission cumulatively receiving the torque from a combustion engine and the torque from an electric machine in a hybrid mode of operation in which these two shafts are rotationally connected by a first coupling means, with the speed of a secondary transmission shaft bearing at least one idler pinion. The synchronization proposed allows one of these pinions to be coupled to its shaft by closing a second coupling means that does not have mechanical synchronizing members.

This invention applies non-limitingly to a hybrid transmission for a motor vehicle provided with a combustion engine and with an electric drive machine, comprising two concentric primary shafts each bearing at least one gear transmitting to a secondary shaft connected to the wheels of the vehicle and a first means of coupling between two primary shafts that can occupy three positions, in which positions: the combustion engine is uncoupled from the drivetrain connecting the electric machine to the wheels, it drives the wheels with or without top-up from the electric machine, or it is coupled to the electric machine so that their torques can be combined.

Description of the Related Art

FIG. 1 describes a non-limiting example of a hybrid transmission using this design principle. This transmission, illustrated in publication WO2012/131259, comprises a solid primary shaft 1 connected directly by a filtration system (damping hub, damper, double fly wheel or the like) 2, to the inertia flywheel 3 of a combustion engine (not depicted). The solid shaft 1 bears an idler pinion 4 that may be connected therewith by a first coupling system 5 (dog clutch, synchromesh, or other type of progressive or non-progressive coupling). A hollow primary shaft 6 is connected to the rotor of an electric machine 7. The hollow shaft 6 bears two fixed pinions 8, 9. It may be connected to the solid primary shaft 1 by means of the first coupling system 5. A secondary shaft 10 bears two idler pinions 11 and 12. The idler pinions 11, 12 may be connected to the primary shaft by way of a second coupling system 13 (dog clutch, synchromesh or other type of progressive or non-progressive coupling). The secondary shaft 10 also bears a fixed pinion 14 and a pinion 15 transmitting to a differential 16 connected to the wheels of the vehicle.

As indicated earlier on, the first coupling means 5 can occupy at least three positions in which:
 the combustion engine is uncoupled from the drivetrain connecting the electric machine 7 to the wheels (sliding gear in the middle as in FIGS. 1, 2 and 3),
 the combustion engine drives the wheels with or without top-up from the electric machine (sliding gear to the left), and
 the combustion engine and the electric machine 7 are coupled in such a way that their respective torques are combined and sent to and the wheels (sliding gear to the right).

In hybrid mode (cf. FIGS. 2 and 3), the electric machine drives the hollow primary shaft 6 whereas the solid shaft receives the torque from the combustion engine. The gearbox has two hybrid gear ratios referred to as "town" and "highway", in which the torque is transmitted to the secondary shaft 10 via the fixed pinions 8 or 9 or no 7. To shift from one of these two ratios to the other, the box has the second coupling system 13. In the absence of synchronizing rings, a system that uses a dog clutch to couple the sliding gear with the pinions requires precise control of the primary speed by the electric machine and/or the combustion engine in order to avoid jerks in the flow of torque.

Publication FR 2 933 247 discloses a method for coupling a shaft of an electric machine with a wheel shaft for an electric or hybrid vehicle. The method described involves the following steps:
 the electric machine is fed a speed setpoint corresponding to the speed of the wheel shaft, disregarding the stepdown ratio between the shaft of the electric machine and the wheel shaft,
 when the speed of the shaft of the electric machine reaches a calibratable threshold, a zero torque is applied to it and a mechanical synchronizing device is actuated so as to equalize the speed of the shaft of the electric machine with the speed of the shaft connected to the wheels, and
 as soon as the speed of the shaft of the electric machine is equal to the speed of the shaft connected to the wheels (disregarding the stepdown ratio), dog-clutch engagement is performed.

With this method, the electric machine is made to operate first of all in order to reach a speed close, but not exactly equal, to that of the shaft connected to the wheels; a synchronizing device then completes the equalizing of the speeds between the two shafts, and then the speed ratio is finally engaged by dog-clutch engagement.

It has already been proposed for the idler pinions on a shaft of a gearbox without a mechanical synchronizing member to be synchronized by simply modulating the torque transmitted to these pinions so as to equalize their speed with the shaft prior to mechanical coupling.

However, in the case of a hybrid vehicle gearbox with concentric primary shafts driven by two power sources which are distinct, but connected to one another by a coupling means, the inertia caused by the machine during certain phases of the gear shift in hybrid mode, includes the combustion engine. The inertia to be overcome by the electric machine is then temporarily multiplied by a factor of ten, leading to torque saturations for this machine.

BRIEF SUMMARY OF THE INVENTION

The control strategy proposed has the object of making the phase of coupling the pinions to their shaft as transparent as possible.

To that end it seeks to provide desaturation of the torque of the electric machine in a way that is transparent to the driver, the torque demand of which needs to continue to be satisfied throughout the gear shift.

To this end, the invention plans for the torque of the electric machine to be temporarily reduced during the synchronizing phase so as to meet the conditions for perfect coupling when its value reaches a ceiling represented by an upper limit value or a lower limit value.

The corresponding device for that reason comprises at least two electric machine command torque desaturation units that allow the torque of the electric machine to be reduced temporarily during the synchronization phase in order to meet the conditions of perfect coupling in all circumstances.

BRIEF DESCRIPTION OF THE SEVERAL VIEWS OF THE DRAWINGS

The present invention will be better understood from reading the following description of one non-limiting embodiment thereof, with reference to the attached drawings in which.

DETAILED DESCRIPTION OF THE INVENTION

Figure 1:
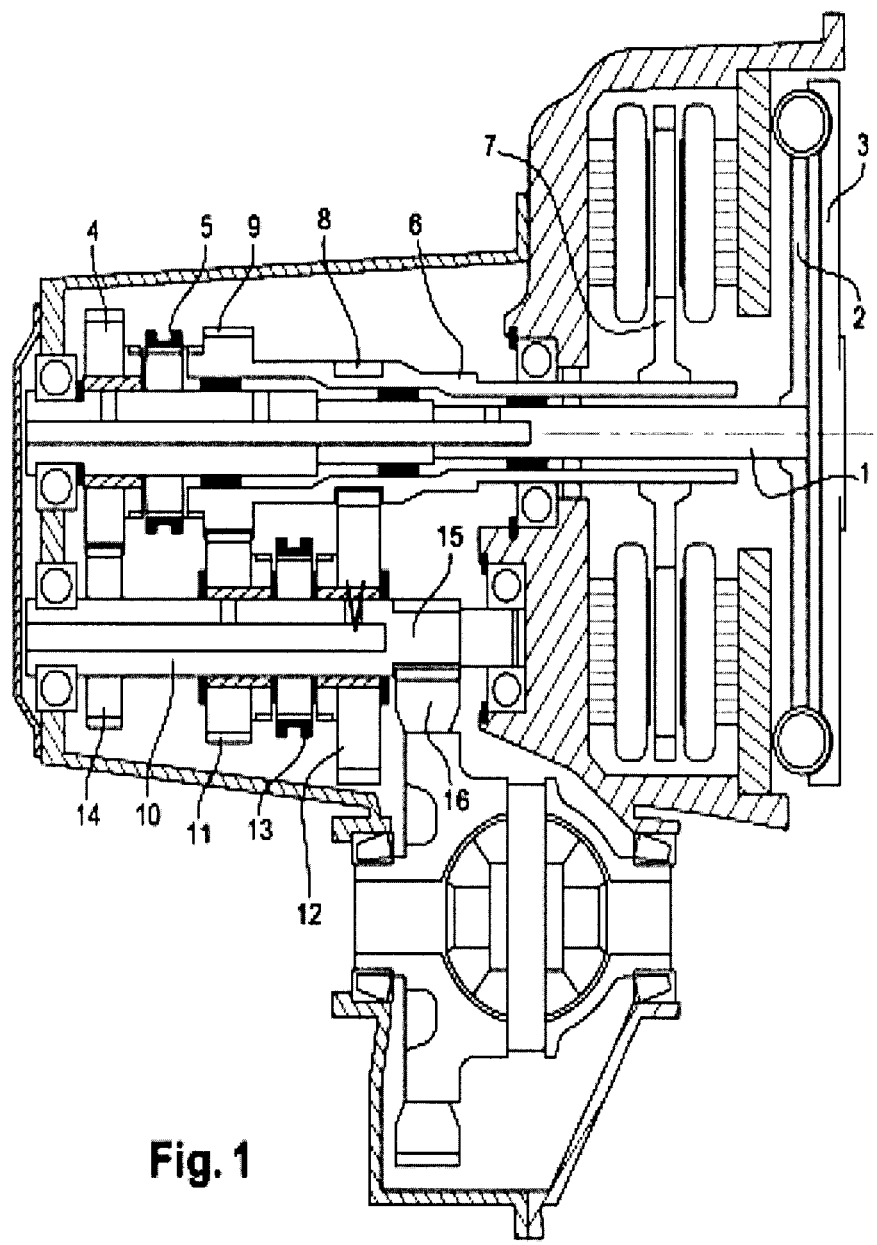
FIGS. 1, 2 and 3 show the drivetrain of a hybrid transmission in neutral and in two of its hybrid gear ratios, FIG. 4 describes the synchronizing device.
Figure 2:
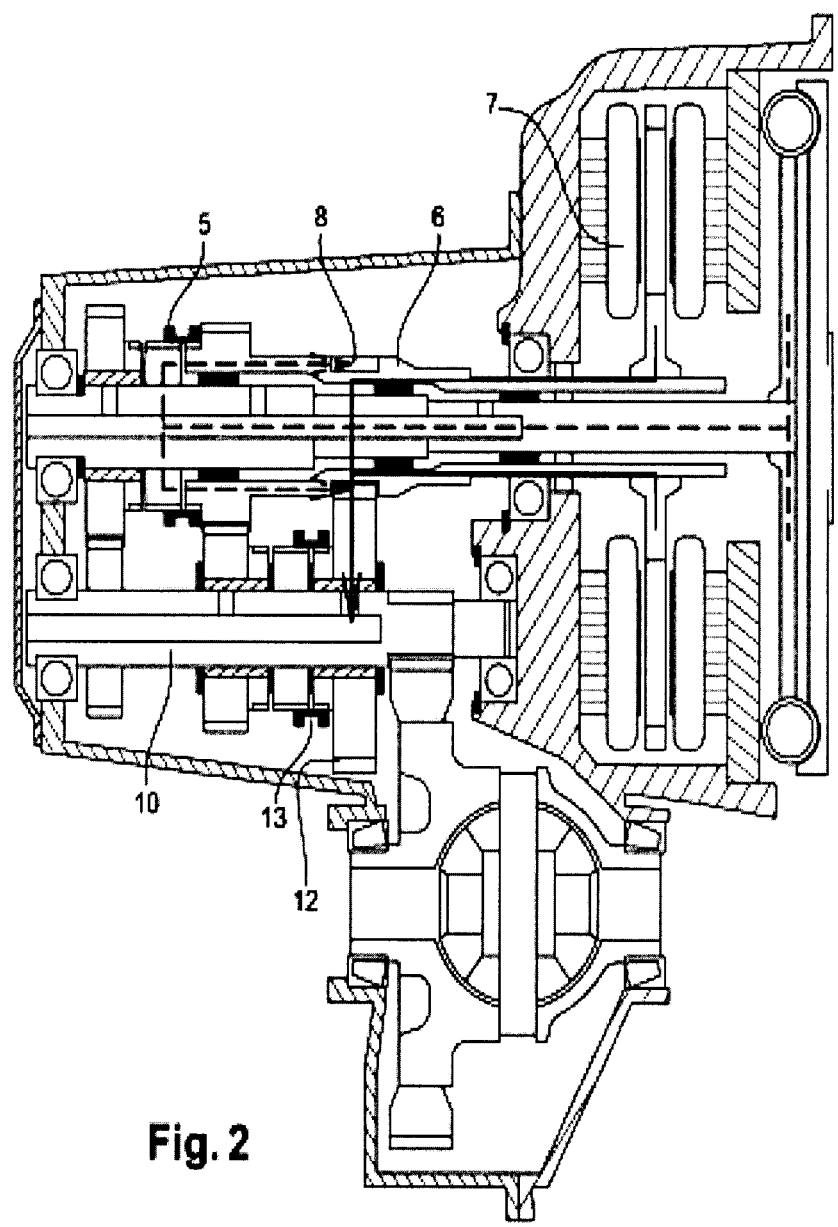

In FIG. 2, the first coupling means 5 is closed in position 3, so as to secure the solid shaft 1 to the hollow shaft 6. The second coupling system 13 is closed, so as to secure the short-ratio idler pinion 12 and the secondary shaft 10. The transmission is in hybrid mode on the short ratio. The contributions from the combustion engine and from the electric machine to the drivetrain combine. They are transmitted from the hollow primary shaft 6 to the secondary shaft by the descent of the pinions 8, 12.

Figure 3:
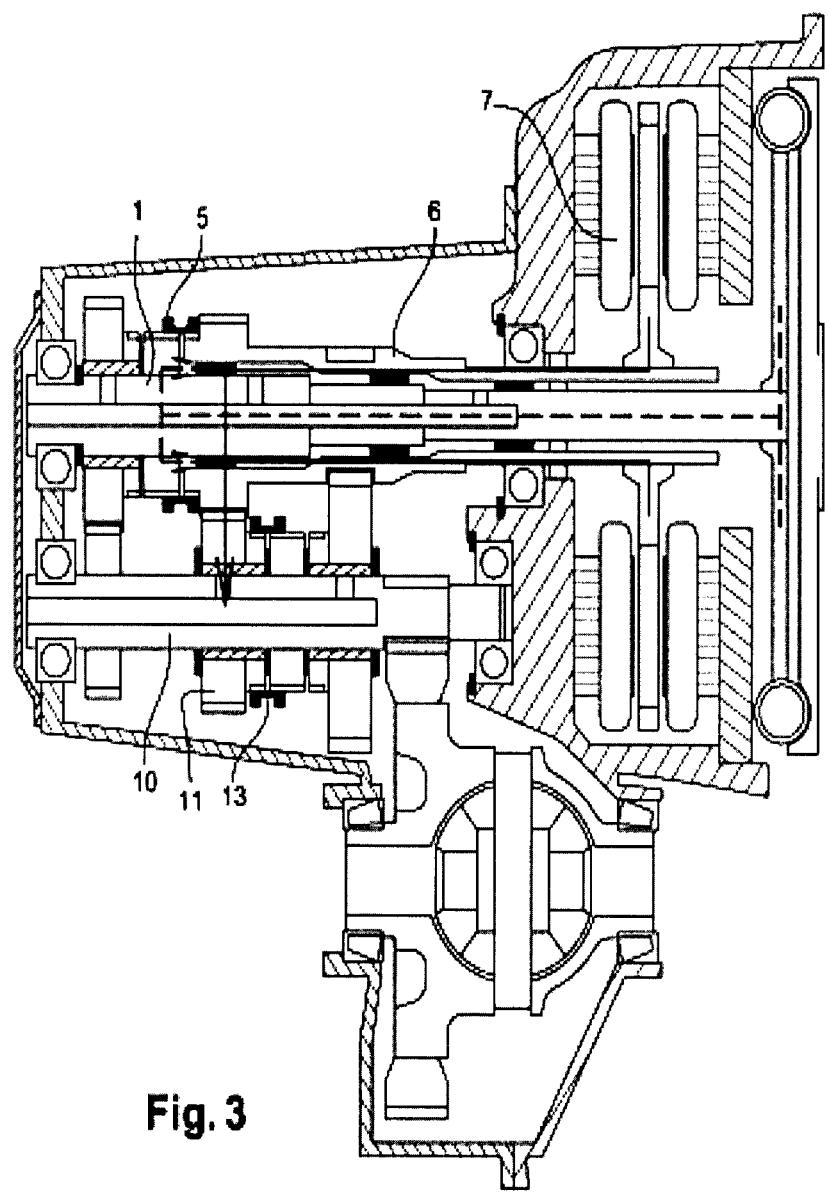
Figure 5:
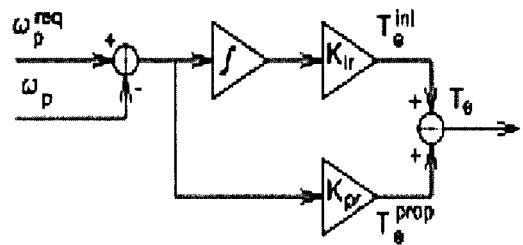
FIG. 5 is the regulator of FIG. 4, FIGS. 6 and 7 show the first and second desaturator of FIG. 4, respectively.

In FIG. 3, the first coupling means 5 is still closed, in position 3, as in FIG. 5. The solid primary shaft 1 is therefore secured to the hollow primary shaft 6. The second coupling system 13 is also closed: the idler pinion 11 of the intermediate gear ratio is secured to the secondary shaft 10. The transmission is in hybrid mode on the intermediate gear ratio. The contributions of the combustion engine and of the electric machine to the drivetrain combine.

The desired synchronization is that of the speed $\overline{\omega}_p$, common to the two concentric primary shafts 1, 6 cumulatively receiving the torque $T_{ice}$ from the combustion engine and the torque $T_e$ from the electric machine 7 in a hybrid mode of operation in which these two shafts are rotationally connected by the first coupling means 5, with the speed $\overline{\omega}_s$ of the secondary transmission shaft 10 which bears the idler pinions 11, 12. It must allow one of these pinions to be coupled to its shaft 10 simply by closing the second coupling means 13, which has no synchronizing members.

As indicated above, in the absence of mechanical synchronizing means, the synchronizing of the idler pinions 11 or 12 before they are coupled by dog clutches to the shaft 10 may be performed by adjusting the torque supplied by the electric machine. This is what is done during shifts between the two hybrid gear ratios, which are carried out with a break in torque by the dog-clutch coupling of the pinions 11 and 12 to the secondary shaft 10. The main difficulties to be overcome in effecting these gear shifts are:

that of following paths of the "ramp" type corresponding to the unfavorable case of heavy braking on a steep downward slope, that of having sufficient static precision so that the speed discrepancy decreases very quickly down to around 30 revolutions per minute (a condition necessary for dog-clutch engagement to be carried out properly), that of desaturating the electric torque as quickly as possible because in this phase the system is likely to become uncontrollable, and that of eliminating the main sources of jerks in the flow of torque likely to be encountered during the coupling phase, thereby also avoiding bad wearing of the mechanical components of the coupling system.

If $\overline{\omega}_e$ is the speed of the electric machine, $T_e$ is the torque of the electric power source and $J_e$ is the inertia of the electric machine, then the dynamics of the electric machine can be written as follows:

$$J_e \dot{\omega}_e = T_e + T_{de},$$

in which expression $T_{de}$ is the resistive torque of the electrical energy source, which is an unknown exogenic input.

Similarly, the dynamics for the combustion engine can be written:

$$J_{ice} \dot{\omega}_{ice} = T_{ice} + T_{dice}; \quad (2)$$

where $J_{ice}$: is the inertia of the combustion engine; $\overline{\omega}_{ice}$ is the speed of the combustion engine; $\dot{\omega}_{ice}$ is the speed of the combustion engine; $T_{ice}$ is the torque of the combustion engine; and $T_{dice}$ is the resistive torque of the combustion energy source, which is an unknown exogenic input.

Given that, during the relevant gear shifts in hybrid mode, $\overline{\omega}_e = \overline{\omega}_{ice} = \overline{\omega}_p$ (primary speed), it is possible to write:

$$(J_{ice} + J_e) \dot{\omega}_p = T_e + T_{ice} + T_{dice} + T_{de}$$

Figure 4:
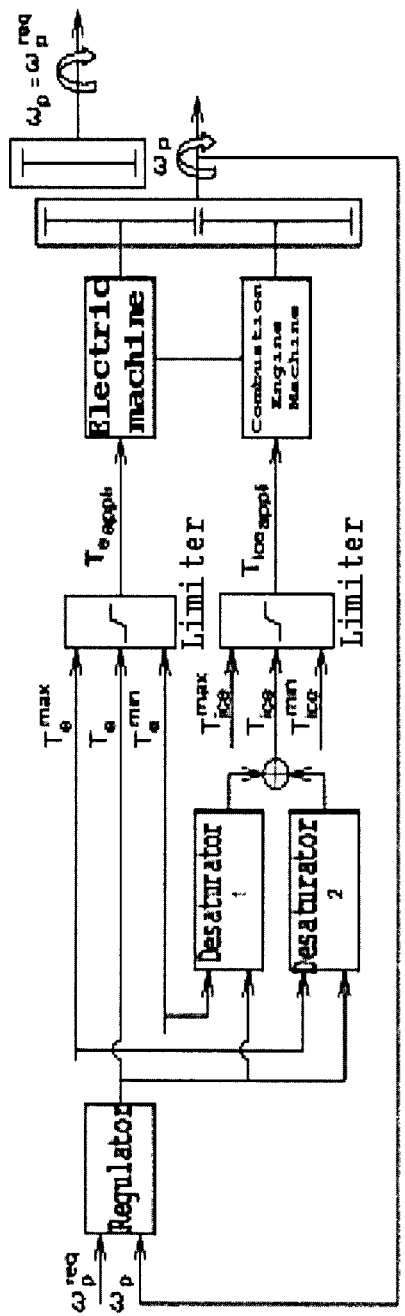

In FIG. 4, $\omega_p$ is still the primary speed associated with the power sources, and $\omega_s$ is the speed of the secondary shaft connected with the wheels of the vehicle. The regulator receives as input the current value $\omega_p$ of the primary speed and the request for a synchronization speed equal to the secondary speed, disregarding the reduction ratio K, between the primary and secondary shaft in the hybrid operation. The regulator sends the electric torque setpoint $T^e$ to the first limiter unit or limiter, which keeps the requested electric torque $T_e^{appli}$ between $T_e^{min}$, the minimum torque of the electric machine, and $T_e^{max}$, the maximum torque of the electric machine.

The values $T_e^{min}$ and $T_e^{max}$ are sent respectively to the low desaturator (1) and to the high desaturator (2). In the event of low or high saturation of the electric torque signal $T_e$, the desaturators send the combustion engine a torque setpoint $T_{ice}$ that is limited by the second limiter between minimum and maximum values ($T_{ice}^{min}$: the min torque of the combustion energy source and $T_{ice}^{max}$: the max torque of the combustion energy source). The second limiter delivers the torque setpoint applied to the combustion engine, $T_{ice}^{appli}$.

The device of FIG. 4 comprises two desaturation units operating on the value of the torque $T_{ice}$ supplied by the combustion engine. It allows the torque of the electric machine to be desaturated by activating the desaturation units 1 and 2, so as to add a "desaturation" combustion torque to the electric machine when the torque $T_e$ reaches a ceiling at its minimum value $T_e^{min}$ (desaturator 1) or its maximum value $T_e^{max}$ (desaturator 2).

This device reduces the electric torque, during the phase of synchronizing the speed of the primary shaft $\omega_p$ and that of the secondary shaft $\omega_s$, disregarding the stepdown ratio K, in order to meet the conditions for perfect coupling of a pinion 11 or 12 to the shaft 10.

The regulator unit of FIG. 5 compares the primary speed request with the primary speed $\omega_p$. An integral value of the difference is introduced into the calculation to eliminate static errors. In order to produce the reference signal $T_e$, the signals generated by the integral action $T_e^{int}$ and the proportional action $T_e^{prop}$ are summed.

The torque $T_e$ produced by the regulator unit of FIG. 5 is then compared against the minimum torque $T_e^{min}$ and against the maximum torque $T_e^{max}$.

Figure 6:
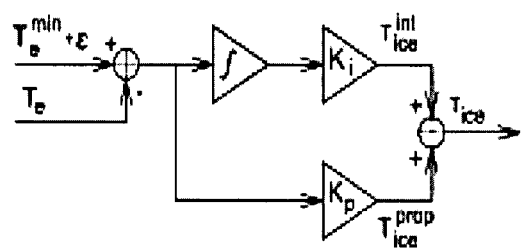

If $T_e \leq T_e^{min}$, the desaturator block 1 of FIG. 6 (in which $K_p$ and $K_i$ are calibratable gains) is activated in such a way as to also provide retardation with the combustion engine until the torque $T_e$ becomes higher than the minimum torque $T_e^{min}$, producing a reference signal $T_{ice}$. To produce this reference signal the signals generated by the integral action "$T_{ice}^{int}$" and the proportional action "$T_{ice}^{prop}$" (cf. FIG. 6) are summed.

The torque of the electric machine 7 is thus reduced by influencing the value of the torque $T_{ice}$ supplied by the combustion engine.

Figure 7:
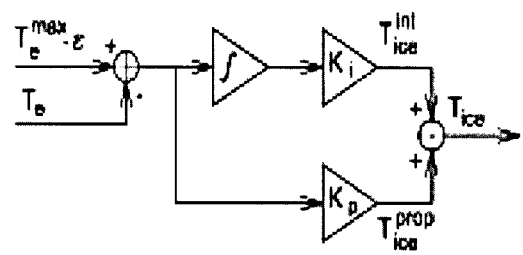

If $T_e \geq T_e^{min}$, the desaturation unit 2 of FIG. 7 (in which $K_p$ and $K_i$ are also calibratable gains) is activated so as to also accelerate with the combustion engine until the torque $T_e$ becomes lower than the max torque $T_e^{max}$, producing a reference signal $T_{ice}$. In order to produce this reference signal, the signals generated by the integral action $T_{ice}^{int}$ and by the proportional action $T_{ice}^{prop}$ are summed (see FIG. 7).

In other words, the torque $T_e$ of the electric machine is temporarily reduced during the synchronization phase in order to meet the conditions of perfect coupling when its value reaches a ceiling at an upper limit value $T_e^{max}$ or a lower limit value $T_e^{min}$.

Figure 8:
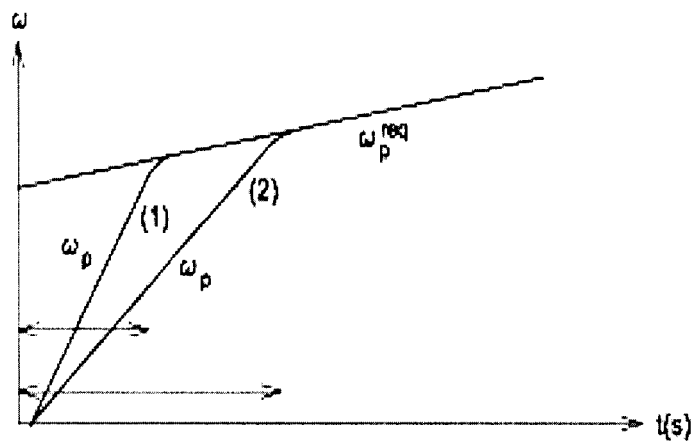
FIG. 8 illustrates the results of the proposed method.

FIG. 8 shows the time saving afforded by the invention in achieving synchronization. In this diagram it may be seen that the primary speed converges on the required value $\omega_p^{rq}$ at least one second earlier with the proposed strategy (curve 1) than in the absence thereof (curve 2).

The advantages offered by the method of the invention are many. Among these it may be noted that it complies with the inherent constraints on the box concerned, which are:
- the ability to follow "ramp" paths in steep descents, corresponding to the unfavorable instances of heavy braking,
- having the required static precision so that the speed discrepancy very quickly falls into a range of 30 revolutions per minute, and
- that the electric torque is desaturated as soon as possible because in this phase the system is susceptible to becoming uncontrollable.

Figure 9:
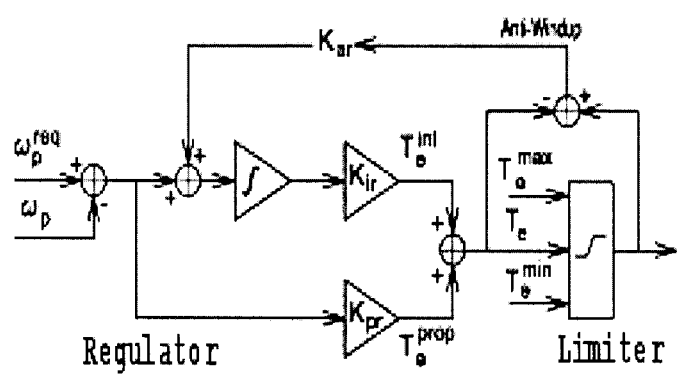
FIG. 9 is another desaturation system.

Finally, it must be emphasized that the desaturation strategies generally applied in the control systems are of the "anti-windup" type, as may be that of FIG. 9, in which the discrepancy between the electric torque signal before and after limiting thereof is looped back into the regulator.

The big difference between the proposed strategy and this type of regulation is that the desaturation is not strictly software but rather the electric machine is desaturated using another source of power such as the combustion engine.

The invention claimed is:

1. A synchronizing method of synchronizing a speed ($\overline{\omega}p$) common to two concentric primary shafts of a hybrid transmission cumulatively receiving torque ($T_{ice}$) from a combustion engine and torque (Te) from an electric machine in a hybrid mode of operation in which the two concentric primary shafts are rotationally connected by a first coupling, with the speed ($\overline{\omega}s$) of a secondary transmission shaft bearing at least one idler pinion, to allow one of the at least one pinion to be coupled to the secondary transmission shaft by closure of a second coupling with no mechanical synchronizing members, the method comprising:

temporarily reducing, via processing circuitry, the torque (Te) of the electric machine during the synchronizing phase to meet the conditions for perfect coupling when the torque (Te) reaches a ceiling represented by an upper limit value ($T_e^{max}$) or a lower limit value ($T_e^{min}$).

2. The synchronizing method as claimed in claim 1, wherein the torque (Te) of the electric machine is reduced by adjusting the magnitude of the torque ($T_{ice}$) supplied by the combustion engine.

3. The synchronizing method as claimed in claim 2, wherein when a demanded torque ($T_e$) demanded of the electric machine is below a minimum torque ($T_e^{min}$), the primary shafts are slowed with the combustion engine.

4. The synchronizing method as claimed in claim 2, wherein when a demanded torque ($T_e$) demanded of the electric machine is above a maximum torque ($T_e^{max}$) the primary shafts are accelerated with the combustion engine.

5. The synchronizing method as claimed in claim 3, wherein the processing circuitry is activated in order to slow or accelerate the combustion engine.

6. The synchronizing method as claimed in claim 1, wherein the first coupling or the second coupling is one of a dog clutch, synchromesh, or progressive or non-progressive coupling.

7. A device comprising:
processing circuitry configured to adjust a magnitude of torque ($T_{ice}$) supplied by a combustion engine thereby synchronizing a speed ($\overline{\omega}p$) common to two concentric primary shafts of a hybrid transmission cumulatively receiving the torque ($T_{ice}$) from the combustion engine and torque (Fe) from an electric machine in a hybrid mode of operation in which the two concentric primary shafts are rotationally connected by a first coupling, with the speed ($\overline{\omega}s$) of a secondary transmission shaft bearing at least one idler pinion, to allow one of the at least one pinion to be coupled to the secondary transmission shaft by closure of a second coupling with no mechanical synchronizing members.

8. The synchronizing device as claimed in claim 7, wherein the processing circuitry is further configured to influence the magnitude of the torque (Te) of the electric machine by reducing the torque (Te) hen a demanded torque ($T_e$) demanded of the electric machine is higher than a maximum torque ($T_e^{max}$) supplied by the combustion engine.

9. The synchronizing device as claimed in claim 8, wherein when the demanded torque ($T_e$) demanded of the electric machine is below a minthium torque ($T_e^{max}$), the processing circuitry is configured to slow down the electric machine along with the combustion engine until the demanded torque $T_e$ becomes higher than the minimum torque ($T_e^{min}$).

10. The synchronizing device as claimed in claim 8, wherein when the demanded torque ($T_e$) demanded of the electric machine is higher than a maximum torque ($T_e^{max}$) the processing circuitry is configured to accelerate the electric machine along with the combustion engine until the demanded torque ($T_e$) of the electric machine becomes lower than the max torque ($T_e^{max}$).

11. The synchronizing device as claimed in claim 9, wherein the processing circuitry is further configured to deliver a combustion engine torque setpoint ($T_{ice}$) allowing the primary speed to he synchronized with the secondary speed to meet the conditions of perfect coupling between a secondary pinion and the secondary transmission shaft.

12. The synchronizing device as claimed in claim 7, wherein the processing circuitry is further configured to keep an electric torque request ($T_e^{appli}$) between a minimum torque value ($T_e^{min}$) and a maximum ($T_e^{max}$ for the electric machine.

13. The synchronizing device as claimed in claim 7, wherein the processing circuitry is further configured to deliver a torque setpoint applied to the combustion engine ($T_{ice}^{appli}$) that is between minimum and maximninr values ($T_{ice}^{min}$:$T_{ice}^{max}$).

\* \* \* \* \*